Aug. 5, 1941.   H. P. KEEFER   2,251,844
BUTTER KNIFE
Filed April 3, 1940
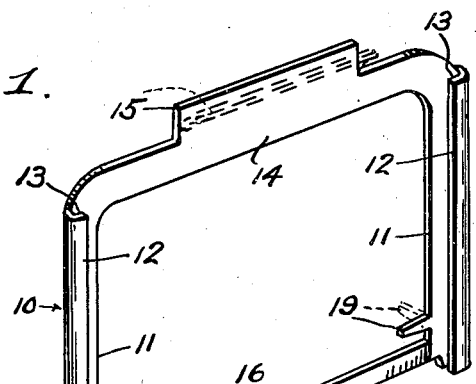
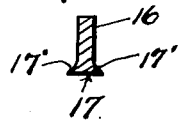
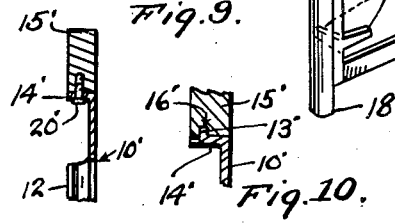
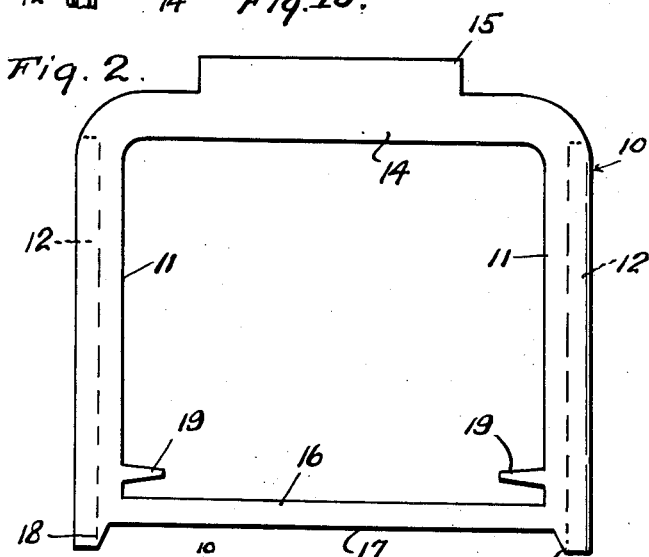
Inventor
Harry P. Keefer
By L. B. James
Attorney Patented Aug. 5, 1941

2,251,844

UNITED STATES PATENT OFFICE 2,251,844

BUTTER KNIFE

Harry Preston Keefer, Alliance, Ohio, assignor of one-half to E. C. Axelrod, Alliance, Ohio Application April 3, 1940, Serial No. 327,723

5 Claims. (Cl. 31—20)

This invention relates to cutlery and more particularly to a knife suitable for use in cutting butter or cheese held in a container such as is shown and described in my co-pending applications bearing the Serial Nos. 242,105 and 275,731 filed November 23, 1938, and May 25, 1939, respectively.

One important object of the invention is to provide a novel and economical form of knife, preferably made of stainless steel, which is particularly adapted for use in connection with such a container as those above mentioned.

A second important object of the invention is to provide a novel construction for a knife of this character whereby it may be connected to and guided by the container structure.

A third important object of the invention is to provide a novel construction of such a knife wherein means are provided for preventing contact of the cutting edge with the metal of any part of the container.

With the above and other objects in view, as will be presently apparent, the invention consists in general of certain novel details of construction and combination of parts hereinafter fully described, illustrated in the accompanying drawing and particularly pointed out in the appended claims.

In the accompanying drawing like characters of reference indicate like parts in the several views, and Fig. 1 is a perspective view of the knife removed from the container.

Fig. 2 is a face view of the knife prior to its attachment to the container.

Fig. 3 is a front end elevation of a container having the knife attached thereto.

Fig. 4 is a fragmentary section on the line 4—4 of Fig. 3 showing the container disposed at 90 degrees to its position in Fig. 3.

Fig. 5 is a fragmentary section on the line 5—5 of Fig. 3.

Fig. 6 is a rear view of a modified form of the knife.

Fig. 7 is a side view thereof.

Fig. 8 is an enlarged detail sectional view of the cutting blade approximately on line 8—8 of Fig. 6.

Figs. 9 and 10 are enlarged detail sectional views approximately on lines 9—9 and 10—10 of Fig. 6.

In the embodiment of the invention here shown the knife is indicated in general at 10 and comprises a substantially rectangular frame preferably formed from a single stamping of thin sheet steel of the stainless steel type. This frame includes a pair of spaced vertical side portions 11 having their outer edges 12 rebent to extend toward each other and provide confronting channels 13. The upper ends of the sides 11 are connected by a bar 14 having an upstanding and rearwardly curved lip 15 at the central portion of its upper edge. The lip 15 is provided for the purpose of forming a finger grip. The connections of the ends of the top bar 14 with the sides 11 are preferably curved as shown. The lower portions of the sides 11 are connected by a knife blade 16 having a cutting edge 17. The connection between the ends of the blade 16 and the sides 11 is made at points on said sides spaced above their lower ends so that those portions of the sides below the blade 16 form legs 18 for purposes presently to be described. Projecting from the inner edges of the sides 11 is a pair of oppositely disposed fingers 19 which, in the completed knife, may be bent rearwardly as shown in Figs. 4 and 5.

This knife is used in connection with a rectangular container, a portion of which is shown at 20. This container is open at its front end and its side walls 21 are provided with outwardly extended flanges 22. When the knife is assembled with the container the flanges 22 engage in the channels 13 so that the knife is guided to move in a vertical rectilinear path. When thus assembled, which is done prior to the rearward bending of the fingers, the rearwardly bent fingers act as stops to engage the top of the container and limit upward movement of the knife.

The container is provided with the usual false bottom or tray 23 to support the butter or cheese in the container, and the legs 18, when the knife is in its lowermost position, engage the bottom of the container and thus prevent forcible contact between the knife edge and the tray 23 which is the only part liable to be engaged by said knife edge.

In operation the knife is raised by the finger grip 15 and the tray drawn out to expose the desired quantity of butter or cheese. The knife is then depressed whereupon the projecting portion of the material on the tray will be neatly severed from the remainder and may be removed. The tray may then be pushed back without lifting the knife since the legs are of such length as to hold the knife edge barely clear of the tray when the knife is depressed.

In the modified form of the knife as shown in Figs. 6, 7, 8, and 9, the numeral 10' designates a substantially rectangular frame preferably formed from a single piece of stainless steel of the general construction as the preferred form but having the upper extremities of its outer edges 12 curved inwardly and merged into a flange 14' disposed along its upper end, said flange having upwardly extending lugs 13' stamped therefrom for seating in apertures 16' formed in the base of a handle 15' secured thereto by a screw 20' or the like.

The blade 16 is preferably formed with laterally extending burrs or ribs 17' on opposite sides of its cutting edge 17 to facilitate cutting of butter or cheese and reduce friction between the body of the blade and opposed surfaces of the butter or cheese as the blade passes therethrough.

There has thus been provided a simple and efficient device of the kind described and for the purpose specified.

It is obvious that changes may be made in the form and construction of the invention without departing from the material principles thereof so that it is to be understood that the invention is not limited to the exact form herein shown and described but includes all such as come within the scope of the appended claims.

What is claimed is:

1. A knife for the purpose described consisting of a rectangular frame having a pair of sides, a top bar connecting the upper ends of said sides, and a knife blade connecting the lower portions of said sides, said sides having their outer edge portions rebent to form opposed guide channels, said sides having stop fingers extending from the inner edges of the sides and opposite each other.

2. A knife for the purpose described consisting of an integral rectangular frame having a pair of sides, a top bar connecting the upper ends of said sides, and a knife blade connecting the lower portions of said sides, said sides having their outer edge portions rebent to form opposed guide channels, said sides having stop fingers extending from the inner edges of the sides and opposite each other, said sides extending below the lower edge of said blade to form stop legs.

3. A knife for the purpose described consisting of a rectangular frame having a pair of sides, a top bar and transversely extending knife blade connecting said sides adjacent their lower ends, said blade having its lower edge upset in thickness to form cutting areas.

4. A knife for the purpose described consisting of a rectangular frame having a pair of sides, a top bar and transversely extending knife blade connecting said sides adjacent their lower ends, said blade having its lower cutting edge of greater thickness than the body portion thereof.

5. A knife for the purpose described consisting of a rectangular frame having a pair of sides, a top bar, a flange formed on the upper portion of the top bar, upwardly extending lugs formed on the flange, a handle having apertures receiving the lugs, means securing the handle to the flange and a transversely extending knife blade having its cutting edge of greater width than the body portion thereof connecting said sides adjacent their lower ends.

HARRY PRESTON KEEFER.